(12) United States Patent
Zhang et al.

(10) Patent No.: US 11,821,465 B2
(45) Date of Patent: Nov. 21, 2023

(54) HEAT-TREATED ROLLER BEARING RING

(71) Applicant: AKTIEBOLAGET SKF, Gothenburg (SE)

(72) Inventors: Feizhou Zhang, Shanghai (CN); Staffan Larsson, Gothenburg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 22 days.

(21) Appl. No.: 17/673,942

(22) Filed: Feb. 17, 2022

(65) Prior Publication Data
US 2022/0268315 A1    Aug. 25, 2022

(30) Foreign Application Priority Data
Feb. 25, 2021    (CN) .......................... 202110211028.X (51) Int. Cl.
| | | |
|---|---|---|
| *F16C 33/62* | (2006.01) | |
| *F16C 33/34* | (2006.01) | |
| *C21D 9/38* | (2006.01) | |

(52) U.S. Cl.
CPC ................ *F16C 33/62* (2013.01); *C21D 9/38* (2013.01); *F16C 33/34* (2013.01); *F16C 2204/72* (2013.01); *F16C 2223/12* (2013.01); *F16C 2223/16* (2013.01)

(58) Field of Classification Search
CPC .......... F16C 33/34; F16C 33/62; F16C 33/36; F16C 33/366; F16C 2204/04; F16C 2204/72; F16C 2204/74; F16C 2223/12; F16C 2223/16; C22C 38/02; C22C 38/04; C22C 38/06; C22C 38/12; C22C 38/18; C22C 38/44; C23C 8/32
See application file for complete search history.

(56) References Cited

U.S. PATENT DOCUMENTS

| | | |
|---|---|---|
| 3,615,908 A | 10/1971 | Waterfall |
| 4,154,629 A | 5/1979 | Asai et al. |
| 4,191,599 A | 3/1980 | Stickels et al. |
| 5,002,729 A | 3/1991 | Wert et al. |
| 5,019,182 A | 5/1991 | Arimi |
| 5,022,934 A | 6/1991 | Schwing et al. |
| 5,424,028 A | 6/1995 | Maloney et al. |
| 5,595,610 A | 1/1997 | Maeda et al. |
| 5,595,613 A | 1/1997 | Hatano et al. |
| 5,873,956 A | 2/1999 | Tanaka et al. |
| 5,997,662 A | 12/1999 | Kanetake |
| 6,179,933 B1 | 1/2001 | Dodd et al. |

(Continued)

FOREIGN PATENT DOCUMENTS

| | | | | |
|---|---|---|---|---|
| EP | 1707647 A1 | * | 10/2006 | ............... C21D 9/40 |
| EP | 3286344 B1 | * | 6/2019 | ............... C21D 1/20 |

(Continued)

*Primary Examiner* — Phillip A Johnson
(74) *Attorney, Agent, or Firm* — J-TEK LAW PLLC; Jeffrey D. Tekanic; Scott T. Wakeman (57) ABSTRACT

An inner ring or and outer ring for a roller bearing includes: 0.30-0.45 wt. % carbon, 0.1-0.7 wt. % silicon, 0.6-0.9 wt. % manganese, 0.9-1.2 wt. % chromium, 0.15-0.7 wt. % molybdenum, 0-2.0 wt. % nickel, 0-0.02 wt. % phosphorus, and 0-0.02 wt. % sulfur, the balance being iron and unavoidable impurities. The microstructure of the steel composition contains bainite, and a carbonitrided case layer is provided on a surface of the inner ring or outer ring.

21 Claims, 3 Drawing Sheets

(56) References Cited

U.S. PATENT DOCUMENTS

| | | |
|---|---|---|
| 6,248,186 B1 | 6/2001 | Yamamura et al. |
| 6,258,179 B1 | 7/2001 | Takayama et al. |
| 6,309,475 B1 | 10/2001 | Takayama et al. |
| 6,447,619 B1 | 9/2002 | Takayama et al. |
| 7,186,304 B2 | 3/2007 | Chin et al. |
| 7,384,488 B2 | 6/2008 | Sandur |
| 7,422,643 B2 | 9/2008 | Takayama et al. |
| 7,544,255 B2 | 6/2009 | Takayama |
| 7,648,588 B2 | 1/2010 | Hammond et al. |
| 7,691,212 B2 | 4/2010 | Takayama |
| 7,691,213 B2 | 4/2010 | Takayama et al. |
| 8,535,457 B2 * | 9/2013 | Maeda ............... C21D 9/40 148/319 |
| 8,714,831 B2 * | 5/2014 | Mori ............... F16C 23/086 420/128 |
| 9,951,816 B2 * | 4/2018 | Sato ............... C21D 9/40 |
| 10,053,763 B2 | 8/2018 | Trivedi et al. |
| 2001/0001396 A1 | 5/2001 | Takayama et al. |
| 2001/0048781 A1 | 12/2001 | Kawamura et al. |
| 2002/0037120 A1 | 3/2002 | Tanaka et al. |
| 2002/0119858 A1 | 8/2002 | Kino et al. |
| 2004/0250921 A1 | 12/2004 | Yamaguchi |
| 2005/0133119 A1 | 6/2005 | Hammond et al. |
| 2005/0268990 A1 | 12/2005 | Chin et al. |
| 2006/0029318 A1 | 2/2006 | Beer et al. |
| 2006/0048861 A1 | 3/2006 | Watanabe et al. |
| 2006/0056754 A1 | 3/2006 | Beer et al. |
| 2007/0000576 A1 | 1/2007 | Blanke |
| 2007/0187002 A1 | 8/2007 | Takahashi et al. |
| 2007/0193660 A1 | 8/2007 | Hammond et al. |
| 2008/0107917 A1 | 5/2008 | Rai et al. |
| 2009/0176142 A1 | 7/2009 | Abd Elhamid et al. |
| 2010/0058592 A1 | 3/2010 | Streit et al. |
| 2010/0314005 A1 | 12/2010 | Saito et al. |
| 2011/0036462 A1 | 2/2011 | Berlier et al. |
| 2012/0018052 A1 | 1/2012 | Moyer |
| 2012/0020605 A1 | 1/2012 | Mori |
| 2012/0255653 A1 | 10/2012 | Chin et al. |
| 2017/0016084 A1 | 1/2017 | Chin et al. |
| 2022/0042545 A1 * | 2/2022 | Neishi ............... C22C 38/02 |

FOREIGN PATENT DOCUMENTS

| | | |
|---|---|---|
| GB | 1185640 A | 3/1970 |
| GB | 2328953 A | 3/1999 |
| WO | 0168933 A1 | 9/2001 |
| WO | WO-2013087379 A1 * | 6/2013 ............... C21D 1/06 |

* cited by examiner

HEAT-TREATED ROLLER BEARING RING

CROSS-REFERENCE

The present application claims priority to Chinese patent application serial number 202110211028.X filed on Feb. 25, 2021, the contents of which are hereby fully incorporated by reference.

TECHNICAL FIELD

The present invention generally relates to the field of metallurgy and to the heat treatment of roller bearing rings. More specifically, the present invention generally relates to techniques involved in the heat treatment of an inner or outer ring for a roller bearing being formed of a medium-carbon steel. The inner or outer ring has comparable or improved wear resistance and loading capacity compared with known roller bearing rings formed from low-carbon steels, yet at a lower manufacturing cost.

BACKGROUND ART

Bearings are devices that permit constrained relative motion between two parts. Rolling element bearings comprise inner and outer raceways (rings) and a plurality of rolling elements (for example balls and/or rollers) disposed therebetween. Roller bearings are rolling element bearings in which the rolling elements are rollers, as opposed to balls, for example. Roller bearings include, e.g., spherical and taper roller bearings. For long-term reliability and performance, it is important that the various structural elements have a high resistance to rolling fatigue, wear and creep.

Conventional techniques for manufacturing metal components involve hot-rolling or hot-forging to form a bar, rod, tube or ring, followed by a soft forming process to obtain the desired component. Surface hardening processes are well known and are used to locally increase the hardness of surfaces of finished or semi-finished components so as to improve, for example, wear resistance and fatigue resistance. A number of surface or case hardening processes are known for improving rolling contact fatigue resistance.

Conventionally, for roller bearings, such as spherical or taper roller bearings, for example, the inner and/or outer ring of the roller bearing is formed from a low-carbon steel. The composition of a typical low-carbon steel used in conventional roller bearing rings is as follows:

0.17-0.23 wt. % carbon;
0.15-0.40 wt. % silicon;
0.40-0.70 wt. % manganese;
0.35-0.64 wt. % chromium;
1.60-2.00 wt. % nickel;
0.20-0.30 wt. % molybdenum;
0-0.02 wt. % phosphorous; and
0-0.02 wt. % sulfur;
the balance being iron and unavoidable impurities.

Conventionally, the low-carbon steels used in roller bearing rings are carburised and subjected to martensitic hardening in order to provide a ring with suitable wear resistance and loading capacity for use as an inner or outer ring for a roller bearing. Due to the relatively low core hardness of the low-carbon martensitic steel (typically less than 40 HRC), the carburised case layer must be relatively deep in order to obtain the required level of wear resistance and loading capacity. In this regard, typical carburised case layer depths in conventional roller bearing rings are from 1.8 to 3.5 mm. Among other reasons, the formation of a carburised case layer on a surface of conventional low-carbon steels at such a case layer depth disadvantageously results in a heat treatment process that requires a long heat treatment cycle time. For example, the heat treatment cycle time required in the production of conventional roller bearing rings formed from low-carbon steels is typically from 25 to 35 hours at a temperature of from 950 to 970° C., in order to produce a 3-3.5 mm carburised case layer. The longer the heat treatment cycle time, the higher the cost of the heat treatment process.

SUMMARY

Accordingly, it is one non-limiting object of the present teachings to disclose improved techniques for designing and manufacturing an inner or outer ring for a roller bearing, preferably at a lower cost, while still exhibiting comparable or improved wear resistance and loading capacity as conventional roller bearing rings.

It is another non-limiting object of the present teachings to disclose techniques for improving heat treatment methods to obtain an inner or outer ring for a roller bearing with comparable or improved wear resistance and loading capacity as conventional roller bearing rings, wherein the method has a lower manufacturing cost as compared to the manufacture of conventional roller bearing rings.

According to a first aspect of the present teachings, an inner or outer ring for a roller bearing is formed from a steel composition comprising:

0.30-0.45 wt. % carbon;
0.1-0.7 wt. % silicon;
0.6-0.9 wt. % manganese;
0.9-1.2 wt. % chromium;
0.15-0.7 wt. % molybdenum;
0-2.0 wt. % nickel;
0-0.02 wt. % phosphorus; and
0-0.02 wt. % sulfur;
the balance being iron and unavoidable impurities;
wherein the microstructure of the steel composition comprises bainite; and
a carbonitrided case layer is provided on a surface of the inner or outer ring.

Accordingly, the present teachings do not follow the convention of using low-carbon steels in the manufacture of roller bearing rings by providing an inner or outer ring for a roller bearing that is formed from a medium-carbon steel. As a result, the inner or outer ring surprisingly exhibits comparable or even improved (superior) physical and mechanical properties, for example wear resistance and load bearing, compared to low-carbon steels, while also achieving a lower manufacturing cost.

DETAILED DESCRIPTION OF PREFERRED EMBODIMENTS

The present teachings will now be described in further detail. In the following passages different aspects of the teachings are defined in more detail. Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Roller bearings and the structures thereof are well known to persons skilled in the bearing field. The shape of the inner or outer ring of the present teachings is not particularly limited and may take the shape of any known inner or outer ring for a roller bearing. The term "inner ring" as used herein preferably refers to a roller bearing ring that is positioned radially inwards relative to the rolling elements in the roller bearing and therefore has a raceway on a radially outer surface of the inner ring. The term "outer ring" as used herein preferably refers to a roller bearing ring that is positioned radially outwards relative to the rolling elements in the roller bearing and therefore has a raceway on a radially inner surface of the outer ring. The inner or outer ring is preferably for a spherical or taper roller bearing. The physical and/or mechanical properties of the inner or outer ring of the present teachings are particularly desirable for use in spherical and/or taper roller bearings due to the loading requirements of such bearings and the high wear resistance and loading capacity exhibited by the inner or outer rings of the present teachings.

The combination of carbonitriding and bainite hardening of the steel composition as described herein is particularly suitable for applications that require a high interference fit, a high operating temperature and/or long service life. Without wishing to be bound be theory, it is thought that this is because the heat treatment gives good hardness retention at high operational temperatures, high residual compressive stress and a tough core.

The steel composition preferably comprises from 0.30 to 0.45 wt. % carbon in its core (the carbonitrided layer will contain carbon in excess thereof). In other words, the outer ring and/or inner ring is made from a steel composition having 0.30 to 0.45 wt. % carbon, which is then subsequently carbonitrided to provide additional carbon (and nitrogen) in the carbonitrided case layer.

Accordingly, the steel composition used to make the outer ring and/or inner ring is a so-called medium-carbon steel. In combination with the other alloying elements, this results in the desired bainitic microstructure, loading capacity, core hardness and impact toughness. Compared to known low-carbon steels used in roller bearing rings, such as spherical and taper roller bearings, such a medium-carbon steel may contribute to developing a higher hardness. Carbon also acts to lower the bainite transformation temperature so that the desired bainitic microstructure is achievable. If the carbon content is higher than 0.45 wt %, there is a reduction in the maximum volume fraction of the bainitic ferrite portion of the microstructure. If the carbon content is lower than 0.30 wt %, the alloys have a higher martensite start temperature; in addition, the bainitic steel composition might not exhibit the desired core hardness and impact toughness. Preferably, the steel composition comprises from 0.32 to 0.43 wt. % carbon, e.g., 0.35 to 0.40 wt. % carbon. In some embodiments, the steel composition comprises from 0.39 to 0.45 wt. % carbon.

The steel composition preferably comprises from 0.1 to 0.7 wt. % silicon. In combination with the other alloying elements, this results in the desired bainitic microstructure with a minimum amount of retained austenite. Silicon has negligible solubility in carbides, particularly at high temperatures where its diffusivity is sufficiently high for it not to be trapped in carbides. Silicon also helps to suppress excessive precipitation of cementite and carbide formation. In addition, silicon stabilises transition carbides and improves the tempering resistance of the steel microstructure. However, too high a silicon content may result in undesirable surface oxides and a poor surface finish and may also result in lowering the elastic properties of the matrix. For this reason, the maximum silicon content is 0.7 wt. %. If the silicon content is lower than 0.1 wt. %, the desired bainitic microstructure might be difficult to obtain without substantial retained austenite; for example, greater than 10 vol. % retained austenite might result if the silicon content is too low. Preferably, the steel composition comprises from 0.2 to 0.6 wt. % silicon, more preferably from 0.3 to 0.5 wt. % silicon, e.g., from 0.35 to 0.45 wt. % silicon. In some embodiments, the steel composition comprises from 0.1 to 0.4 wt. % silicon or 0.2 to 0.4 wt % silicon.

The steel composition preferably comprises from 0.6 to 0.9 wt. % manganese. In combination with the other alloying elements, manganese acts to improve hardenability. Accordingly, if the manganese content is lower than 0.6 wt. %, a steel composition having both the desired bainitic microstructure and high core hardness might not be readily achievable. In addition, manganese acts to increase the stability of austenite relative to ferrite. However, manganese levels above 0.9 wt. % may serve to increase the amount of retained austenite and to decrease the rate of transformation to bainite. This may lead to practical metallurgical issues such as stabilising the retained austenite too much, leading to potential problems with the dimensional stability of the bearing components. Preferably, the steel composition comprises from 0.65 to 0.85 wt. % manganese, e.g., from 0.7 to 0.8 wt. % manganese.

The steel composition preferably comprises from 0.9 to 1.2 wt. % chromium. Chromium acts to increase hardenability and reduce (lower) the bainite transformation start temperature. Thus, if the chromium content is lower than 0.9 wt. %, a steel composition having both the desired bainitic microstructure and high core hardness might not be readily achievable. If the chromium content is higher than 1.2 wt. %, there may be an increased risk of segregation issues within the structure and composition of the steel. Preferably, the steel composition comprises from 0.95 to 1.15 wt. % chromium, e.g., from 1.0 to 1.1 wt. % chromium.

The steel composition optionally comprises from 0 to 2.0 wt. % nickel, for example 0.1 to 2.0 wt. % Ni. Nickel may be beneficial in terms of general toughness and/or impact properties, for example. Preferably, the steel composition comprises 1.0 to 2.0 wt. % nickel. In some embodiments, the steel composition comprises from 0 to 0.7 wt. % nickel, for example 0.1 to 0.7 wt. % Ni.

The steel composition preferably comprises from 0.15 to 0.7 wt. % molybdenum. Molybdenum may act to avoid austenite grain boundary embrittlement owing to impurities such as, for example, phosphorus. Molybdenum may also reduce (lower) the bainite transformation start temperature and increase hardenability, which is important when the steel is used to manufacture, e.g., a large-sized bearing ring that requires hardening to a relatively large depth upon quenching from a high temperature. Thus, if the molybdenum content is lower than 0.15 wt. %, a steel composition having both the desired bainitic microstructure and high core hardness might not be readily achievable. The molybdenum content in the alloy is preferably no more than about 0.7 wt. %, otherwise the austenite transformation into bainitic ferrite might cease too early, which can result in significant amounts of austenite being retained in the structure. Molybdenum may also contribute to an increased rolling contact fatigue resistance by creating finely dispersed molybdenum carbides. Preferably, the steel composition comprises from 0.2 to 0.6 wt. % molybdenum, e.g., from 0.3 to 0.5 wt. % molybdenum. In some embodiments, the steel composition comprises from 0.15 to 0.30 wt. % molybdenum.

It will be appreciated that the steel composition referred to herein may contain unavoidable impurities, although, in total, these are unlikely to exceed 0.3 wt. % of the composition. Preferably, the steel composition contains unavoidable impurities in an amount of not more than 0.1 wt. % of the composition, more preferably not more than 0.05 wt. % of the composition. In particular, the steel composition may also include one or more impurity elements. A non-exhaustive list of impurities includes, for example:

0 to 0.02 wt. % phosphorus
0 to 0.02 wt. % sulfur
0 to 0.04 wt. % arsenic
0 to 0.075 wt. % tin
0 to 0.075 wt. % antimony
0 to 0.002 wt. % lead
0 to 0.002 wt. % boron.

The steel alloy composition preferably comprises little or no phosphorous, for example from 0 to 0.015 wt. % phosphorous.

The steel alloy composition preferably comprises little or no sulfur, for example from 0 to 0.015 wt. % sulfur.

The steel composition preferably comprises ≤15 ppm oxygen. Oxygen may be present as an impurity. The steel composition preferably comprises ≤30 ppm titanium. Titanium may be present as an impurity. The steel composition preferably comprises ≤20 ppm boron. The steel composition preferably comprises ≤50 ppm calcium. Calcium may be present as an impurity.

The steel composition described herein may consist essentially of the recited elements. It will therefore be appreciated that, in addition to those elements that are mandatory, other non-specified elements may be present in the composition, provided that the essential characteristics of the composition are not materially affected by their presence. The steel composition described herein may consist of the recited elements.

It will be appreciated that the steel composition used to manufacture the inner or outer ring for a roller bearing of the present teachings may be a known steel composition, such as a known medium-carbon steel. Conventionally, low-carbon steels are used for roller bearing rings. In contrast, medium-carbon steels such as those described herein are normally used for slewing bearings, for example. Slewing bearings are typically used in applications which require lower loading per unit area and slower running/rotating speeds than roller bearings. Previously, it has not been desirable to use the medium-carbon steels used in slewing bearings, for example, in roller bearings because of the relatively low strength and wear resistance exhibited thereby. The medium-carbon steels typically used in slewing bearings, which have not been heat treated as described herein, would not satisfy the load bearing capacity nor abrasive wear requirements for the applications of roller bearings. Thus, it is surprising and unexpected that the heat treated medium-carbon steel used in the present teachings exhibits the desirable properties described herein, and that a suitable inner or outer ring for a roller bearing can be provided with acceptable load bearing and wear resistance properties for use in typical roller bearing applications.

The use of such a medium-carbon steel for a roller bearing ring is advantageous at least because, compared with the conventional low-carbon steels, use of the medium-carbon steel used herein is cheaper. However, the microstructure of the medium-carbon steel and case layer type and depth need to be selected and optimised, and the heat-treatment parameters need to be optimised in order to provide a ring from this unconventional steel that would be suitable for use as an inner or outer ring for a roller bearing, i.e. a roller bearing ring having suitable wear resistance and loading capacity.

In this regard, in the present teachings the microstructure of the steel composition preferably comprises bainite. For example, the microstructure of the steel composition typically comprises at least 60 vol. % bainite, e.g., at least 80 vol. % bainite, e.g., at least 90 vol. % bainite, e.g., at least 95 vol. % bainite. Methods of bainite hardening (transformation) are well known by those skilled in the field. However, the heat-treatment parameters may be optimised for the medium-carbon steel described herein in order to obtain a suitable roller bearing ring having acceptable wear resistance and loading capacity. The microstructure of the steel composition may also comprise small amounts of martensite, for example less than 20 vol. % martensite or even less than 10 vol. %, particularly in the core of the inner or outer ring.

Preferably, the retained austenite content in the steel composition is kept to a minimum to improve strength, hardness and, in particular, dimensional stability. The amount of retained austenite is typically less than 10 vol. %, more typically less than 5 vol. %. In some embodiments, the microstructure of the steel composition is free or substantially free from retained austenite, e.g., 0.2 vol. % or less. However, in some embodiments the steel composition may comprise a small amount of retained austenite, which may be beneficial in prolonging the service life of the bearing. The microstructure may also contain small carbide, nitride and/or carbo-nitride precipitates, for example nano-scale precipitates, typically 5-30 nm average size or micro-scale precipitates, typically 1-10 μm average size. The presence of such precipitates may improve the wear resistance of the raceway. Any such precipitates typically make up no more than 5 vol %, more typically no more than 3 vol % of the microstructure, for example from 0.5 to 3 vol %. In one embodiment, the structure is free or at least essentially free (e.g., 0.2 vol. % or less) of carbides, nitrides and/or carbo-nitrides.

The microstructure structure of the steel composition may be determined by conventional microstructural characterization techniques such as, for example, optical microscopy, TEM, SEM, AP-FIM, and X-ray diffraction, including combinations of two or more of these techniques.

Among other things, such a microstructure may give the steel composition a desirable core hardness and thus, may give the inner or outer ring a desirable loading capacity, for example. This high core hardness of the bainitic medium-carbon steel may also enable the depth of the case layer to be reduced compared with conventional roller bearing rings, thereby reducing the heat treatment cycle time required, and therefore the manufacturing costs as a result.

In this regard, in the present teachings a carbonitrided case layer is provided on a surface of the inner or outer ring. Carbonitriding processes are well known by those skilled in the field. However, the carbonitriding parameters may be optimised for the medium-carbon steel described herein in order to obtain a suitable roller bearing ring having an acceptable wear resistance and loading capacity. The carbonitrided case layer provides the surface of the inner or outer ring with a higher surface hardness and thus, a higher wear resistance.

It has been surprisingly found that the use of the medium-carbon steel described herein for an inner or outer ring for a roller bearing, wherein the microstructure of the steel composition comprises bainite, and wherein a carbonitrided case layer is provided on a surface of the inner or outer ring, enables an inner or outer ring for a roller bearing to be provided that may have comparable or improved wear resistance and loading capacity compared to conventional roller bearing rings that use low-carbon steel, for example, while being manufacturable at a lower manufacturing cost.

Typically, the carbonitrided case layer is provided on at least a raceway surface of the inner ring and/or outer ring that will support (contact) the rolling elements. This is at least because high surface hardness and wear resistance is particularly desirable on the raceway. However, the carbonitrided case layer may also be provided on any other surface of the inner or outer ring and is not restricted to only the raceway surface.

The carbonitrided case layer preferably has a case layer depth of from 0.7 to 3.5 mm, more preferably from 1.0 to 2.5 mm. In some embodiments the carbonitrided case layer has a case layer depth of from 1.0 to 1.8 mm or even 1.0 to 1.6 mm. The carburised case layer depth of conventional roller bearing rings is typically from 1.8 to 3.5 mm. Without wishing to be bound by theory, this reduction in case layer depth may be possible as a result of the use of bainitic medium-carbon steel for the inner or outer ring. According to the Hertzian stress model theory, the carburising thickness of medium-carbon steel can be reduced, for example, by one third compared to traditional low-carbon steel carburising. The core hardness of the conventional low-carbon steel roller bearing rings (after carburising and martensitic hardening) is typically 40 HRC or less. However, the core hardness of the bainitic medium-carbon steel of the present teachings is typically greater than 40 HRC. Accordingly, the case layer depth may be reduced while maintaining suitable wear resistance and loading capacity of the inner or outer ring and, as a result, the manufacturing process time can be reduced, e.g., by one-third or one-fourth. Advantageously, this reduction of processing time may significantly reduce the manufacturing costs of roller bearing rings. For example, a 1.8 to 2.5 mm case layer depth in the medium-carbon steel of the present teachings may exhibit comparable properties to a 2.5-3.0 mm case layer depth on a low-carbon steel of the prior art when subjected to the same loading requirements. In general, the thinner carbonitrided case layer of the present teachings has better or equivalent wear resistance on the raceway in comparison to traditional low-carbon steel carburised rings both in the outer and inner rings of the present teachings. Under the raceway (carbonitrided case layer), the core of the inner or outer ring of the present teachings exhibits desirable toughness.

The case layer depth may be measured using conventional techniques known in the field. Suitable methods may include, for example, inspection of a cross-section of the inner or outer ring by optical microscopy, TEM, SEM, AP-FIM, and X-ray diffraction, or combinations of two or more of these techniques.

Preferably, the microstructure of the case layer comprises less than 3 vol. % retained austenite, more preferably substantially no retained austenite (e.g., 0.2 vol. % or less). In general, if the bearing is sealed, well lubricated and there is no metal-to-metal contact, then there may be no appreciable advantage to having retained austenite in the microstructure of the case layer. However, if debris is expected to enter into the bearing during operation and there is only a partial lubrication film and/or metal-to-metal contact, then there may be an advantage to retaining a small amount of austenite in the microstructure of the case layer, for example from 10 to 20 vol. %. This may increase rolling contact fatigue and inhibit spalling and/or pitting, depending on the bearing design. Accordingly, in some embodiments the microstructure of the case layer may comprise austenite, such as from 10 to 20 vol. % retained austenite. The austenite may be retained in the case layer from before the bainite hardening step in the manufacture of the inner or outer ring. This may provide the inner or outer ring with higher surface hardness and thus, higher wear resistance. This is particularly important for the raceway surface.

The inner or outer ring of the present teachings typically has a core hardness of greater than 40 HRC, preferably greater than 45 HRC. In one embodiment, the inner or outer ring has a core hardness of from 40 to 48 HRC. Typically, the core hardness is not greater than 50 HRC. As discussed above, the high hardness of the bainitic medium-carbon steel advantageously enables the case layer depth of the inner or outer ring to be reduced, reducing the manufacturing cost of the inner or outer ring.

The units "HRC" as used herein denotes the Rockwell 'C' scale and is known to those skilled in the field. Measurement of hardness on the Rockwell 'C' scale may be performed by any indentation method known to those skilled in the field. The Vickers hardness test may also be used to measure the core hardness of the inner or outer ring. Conventional methods are known to those skilled in the field.

The inner or outer ring preferably has a residual compressive stress of at least −200 MPa at a distance of 100 µm or more perpendicular (normal) from the carbonitrided surface of the inner or outer ring, preferably at least −300 MPa, more preferably at least −400 MPa. Generally speaking, the residual compressive strength may be from −200 to −900 MPa at a distance of 100 µm or more perpendicular from the carbonitrided surface of the inner or outer ring. Advantageously, the higher magnitude of the residual compressive stress may improve the fatigue life of the bearing. This is in contrast to a residual compressive stress of about −200 MPa for martensitic quenching of the medium-carbon steel. The raceway of the inner or outer ring has a positive residual compressive stress of 500 to 600 MPa at the surface. Such a residual compressive stress may improve the fatigue life of the bearing. Without wishing to be bound by theory, it is thought that the method of heat-treatment used to manufacture the inner or outer ring described herein results in the above residual compressive stresses in the ring, for example due to the bainite hardening (transformation) process. Residual compressive stress may be measured using an X-ray diffraction analyser. Conventional techniques are known to those skilled in the field.

Advantageously, the inner or outer ring also exhibits high impact toughness. The impact toughness of bainite is typically higher than martensite having the same hardness.

Advantageously, the machining properties (both hot and cold machining) are not significantly different between the low- and medium-carbon steels of the prior art, and the present teachings.

The inner or outer ring of the present teachings may be for a taper roller bearing having, e.g., an outer diameter of about 230 mm and an inner diameter of about 130 mm. However, it will be appreciated that any appropriate size of inner or outer ring may be provided within the scope of the claims appended hereto.

According to a further aspect of the present teachings, a method of heat treatment to obtain an inner or outer ring for a roller bearing may preferably comprise:
(i) providing a ring formed from a steel composition comprising:
0.30-0.45 wt. % carbon;
0.1-0.7 wt. % silicon;
0.6-0.9 wt. % manganese;
0.9-1.2 wt. % chromium;
0.15-0.7 wt. % molybdenum;
0-2.0 wt. % nickel;
0-0.02 wt. % phosphorus; and
0-0.02 wt. % sulfur;
the balance being iron and unavoidable impurities;
(ii) subjecting the ring to a carbonitriding process to obtain a carbonitrided ring, wherein a carbonitrided case layer is provided on a surface of the carbonitrided ring;
(iii) heating the carbonitrided ring to at least partially austenitize the steel composition;
(iv) maintaining the carbonitrided ring at a temperature of from 210° C. to 250° C. for from 4 to 7 hours after step (iii) to obtain a heat-treated ring wherein the microstructure of the steel composition comprises bainite; and
(v) recovering the heat-treated ring.

The inner or outer ring provided for the method of heat treatment described herein may be obtained by any conventional means known to those skilled in the field. By way of example, a ring for the heat treatment may be provided as follows. First, the steel composition is prepared and cast. The steel composition may then be subjected to a conventional high-temperature soaking step, followed by hot-rolling, typically at a starting temperature of about 1150° C. Several hot-rolling passes may be performed as necessary. The hot-rolled steel, which can be in a bar or plate form, is then allowed to cool slowly to room temperature to avoid the formation of high-carbon martensite. A typical preferred microstructure in the as hot-rolled condition, at room temperature, is pearlite.

The hot-rolled material may then optionally be homogenised in a homogenisation step, such as an approx. 1200° C. treatment (e.g., 1100° C.-1300° C., or 1150° C.-1250° C.) for about 24 to 48 hours in vacuum. The material may then, optionally, be furnace-cooled to allow it to cool down slowly to room temperature, also under vacuum.

The material may then be machined in a machining step to near-net-shape components, i.e. the inner or outer ring used in the method described herein.

In step (ii) of the method described herein, the ring is subjected to a carbonitriding process to obtain a carbonitrided ring. The carbonitrided ring has a carbonitrided case layer provided on a surface thereof, preferably on a raceway surface thereof. Carbonitriding processes in general are known to those skilled in the field. The carbonitriding process may include heating the ring in an atmosphere containing carbon monoxide and ammonia, for example. However, other sources of carbon (such as acetylene or propane) and/or other sources of nitrogen (e.g., $N_2$) also may be used.

The total duration of the carbonitriding process of step (ii) is preferably from 5 to 35 hours, depending on the required case layer depth. More preferably, the total duration of the carbonitriding process of step (ii) is less than 25 hours. In some embodiments, the total duration of the carbonitriding process of step (ii) is from 10 to 23 hours. For example, when the total duration of the carbonitriding process of step (ii) is about 22 hours, a case layer depth of from 2.5 to 3.0 mm can be obtained. As will be known to the skilled person, the duration of the carbonitriding step will depend on at least the required case layer depth and the heating temperature.

The conditions of the carbonitriding process of step (ii) preferably include heating the ring to a temperature of 850° C. to 970° C. in an atmosphere having a carbon monoxide concentration of from 5 to 25 vol. % and an ammonia concentration of from 5 to 15 vol. %, preferably wherein the carbon potential of the atmosphere is from 0.6 to 1.2%. In some embodiments, for example, the conditions of the carbonitriding process of step (ii) include heating the ring to a temperature of from 850° C. to 900° C. In other embodiments, the conditions of the carbonitriding process of step (ii) include heating the ring to a temperature of from 900° C. to 970° C., or from 870° C. to 920° C. In some embodiments, for example, the conditions of the carbonitriding process of step (ii) include heating the ring in an atmosphere having a carbon monoxide concentration of from 5 to 15 vol. %. In other embodiments, the conditions of the carbonitriding process of step (ii) include heating the ring in an atmosphere having a carbon monoxide concentration of from 15 to 25 vol. %, or from 10 to 20 vol. %. In some embodiments, for example, the conditions of the carbonitriding process of step (ii) include heating the ring in an atmosphere having an ammonia concentration of from 5 to 10 vol. %. In other embodiments, the conditions of the carbonitriding process of step (ii) include heating the ring in an atmosphere having an ammonia concentration of from 10 to 15 vol. %, or from 7 to 13 vol. %. In some embodiments, for example, the conditions of the carbonitriding process of step (ii) include heating the ring in an atmosphere having a carbon potential of from 0.6 to 0.8%. In other embodiments, the conditions of the carbonitriding process of step (ii) include heating the ring in an atmosphere having a carbon potential of from 0.8 to 1.2%, or from 0.7 to 1.1%.

Suitable equipment and methods of maintaining a suitable atmosphere for the carbonitriding process are known to those skilled in the field. For example, an oxygen probe and/or a carbon control meter may be used. Suitable conventional techniques are known to those skilled in the field.

In step (iii) of the method described herein, the carbonitrided ring is heated to at least partially austenitize the steel composition. Preferably, step (iii) comprises heating the carbonitrided ring to a temperature of from 860° C. to 880° C. for from 60 to 90 minutes. More preferably, step (iii) comprises heating the carbonitrided ring to a temperature of from 865° C. to 875° C. for from 70 to 80 minutes, for example. Austenitic steel and the structure thereof are well known to those skilled in the field.

In step (iv) of the method described herein, the carbonitrided ring is maintained at a temperature of from 210° C. to 250° C. for 4 to 7 hours after step (iii) to obtain a heat-treated ring wherein the microstructure of the steel composition comprises bainite. In some embodiments, the carbonitrided ring is maintained at a temperature of from 210° C. to 230° C., for example. In other embodiments, the carbonitrided ring is maintained at a temperature of from 230° C. to 250° C., or from 220° C. to 240° C. In some embodiments, the carbonitrided ring is maintained at a temperature of from 210° C. to 250° C. for from 5 to 6 hours. For example, the carbonitrided ring may be maintained at such a temperature using a salt bath. However, other methods of quenching and/or temperature control may be used. As will be appreciated by those skilled in the field, the shorter the duration of time that the carbonitrided ring is maintained at the bainitic transformation temperature (or within the bainitic transformation temperature), the more cost effective the overall process. Thus, a shorter duration is desirable from a manufacturing cost standpoint.

The bainite hardening (transformation) process may comprise, for example, one, two or three transformation stages, one or more of which (including all three transformation stages) is carried out at different temperatures. The objective is to optimise the hardness and the overall transformation time. After bainite transformation has ceased, the components are typically cooled to room temperature.

Advantageously, the method of heat treatment described herein has a shorter heat treatment cycle time compared to methods of heat treating conventional low-carbon roller bearing rings, e.g., carburising followed by martensitic hardening. It has been surprisingly found that the methods described herein advantageously achieve this shorter heat treatment cycle time while also being able to provide an inner or outer ring having high wear resistance and high loading capacity so that the inner or outer ring is suitable for use in a roller bearing. Accordingly, an inner or outer ring for a roller bearing can be provided at lower manufacturing cost.

Optionally, the inner or outer ring described herein may be subjected to a surface finishing technique, e.g., burnishing—especially for raceways —, which may be followed by tempering and air-cooling. Afterwards, the inner or outer ring may be finished by performing hard-turning and/or grinding operations such as lapping and honing.

The burnishing and tempering operations may cause the yield strength of the affected areas to increase dramatically with significant improvement in hardness, compressive residual stress and better resistance to rolling contact fatigue.

It should be understood that the methods of heat treatment disclosed herein are not limited to inner or outer rings for roller bearings. For example, the methods disclosed herein may also be used for any type of bearing component, such as the inner and/or outer ring or rolling element, as long as the inherent hardenability is enough for the ring wall section, roller diameter and/or ball diameter, for example. As such, the present teachings also provide a rolling element, such as a roller or a spherical rolling element, which has been heat treated as described herein and a method of heat treatment as described herein to obtain such a rolling element.

According to a further aspect, there is provided an inner or outer ring as described herein, wherein the inner or outer ring has been heat treated by a method as described herein.

According to a further aspect, there is provided a roller bearing comprising an inner ring and/or outer ring as described herein. Such a roller bearing preferably comprises rolling elements, such as barrel (spherical, symmetrical) rolling elements or tapered (conical) roller elements, disposed on (contacting) a raceway surface of the inner ring and/or a raceway surface of the outer ring.

More specifically, spherical roller bearings have two rows of symmetrical rollers, a common sphered outer ring raceway and two inner ring raceways inclined at an angle to the bearing axis. The center point of the sphere in the outer ring raceway is at the bearing axis. The symmetrical rollers (rolling elements) have a barrel shape in side view, in which the diameter of the ends of the symmetrical rollers is smaller than the diameter of an intermediate portion of the symmetrical roller along its longitudinal extension.

Tapered roller bearings feature a cup and cone assembly. The cup is comprised of the outer ring and the cone assembly consists of an inner ring, rollers (rolling elements), and a cage. The rollers (rolling elements) have a truncated cone shape. This bearing construction accommodates combined loads (i.e. axial and radial loads) and provides low friction during operation. Tapered rolling bearings can be configured, e.g., as single-row, double-row or four-row tapered rolling bearings.

Representative, non-limiting exemplary working examples of the present teachings will now be further discussed with reference to the appended Figures.

Figure 1:
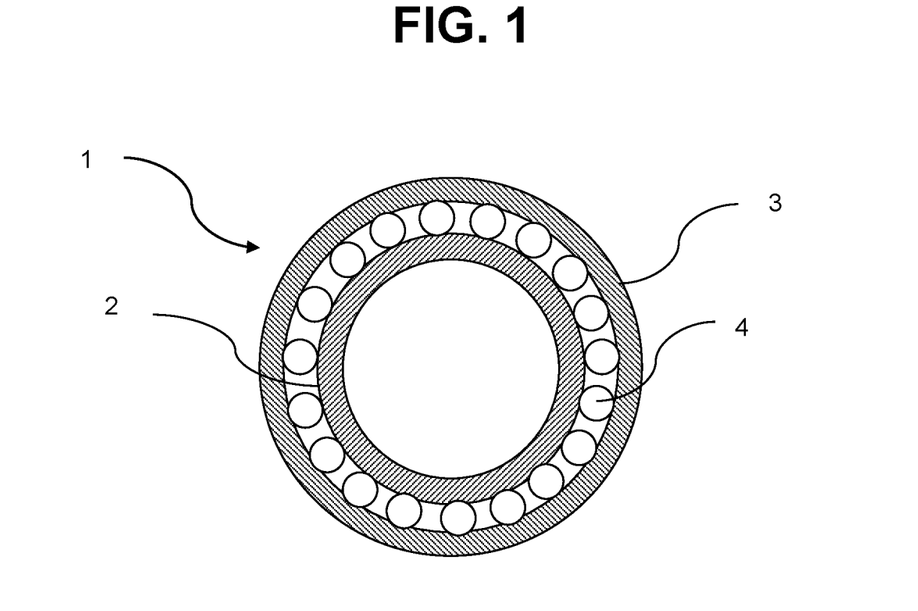
FIG. 1 shows a simplified schematic of a cross section of a roller bearing as described herein (shown generally at 1) comprising an inner ring 2, an outer ring 3, and a plurality of roller bearing elements (rollers) 4 disposed therebetween, viewed in the axial direction.

FIG. 1 shows a simplified schematic of a cross section of a roller bearing 1 comprising an inner ring 2, an outer ring 3, and a plurality of roller bearing elements (rollers or rolling elements) 4 disposed therebetween, viewed in the axial direction. It will be appreciated that the present teachings are not limited to such a configuration and that the present invention may be suitable for use in any known roller bearing configuration.

Example 1

A prototype of an inner ring of a 22220-type bearing was manufactured according to the present teachings. The inner ring was formed from a steel composition comprising (all in weight percent) 0.42 C, 1.05 Cr, 0.75 Mn, 0.25 Mo, and 0.30 Si, the balance being iron and unavoidable impurities.

Figure 2:
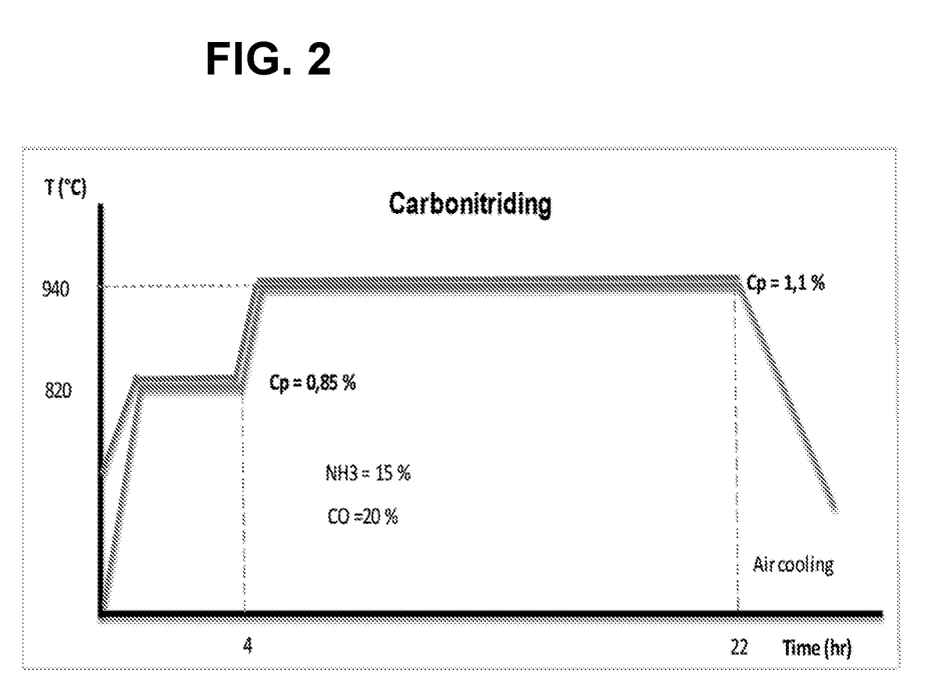
FIG. 2 shows the carbonitriding conditions used in Example 1.

The inner ring of a 22220-type bearing was carbonitrided in two steps under the following conditions:
Carbonitriding parameters step 1:
Temperature: 820° C.
Time: 4 hours
Cp: 0.85%
CO: 15 vol. %
$NH_3$: 15 vol. %
Carbonitriding parameters step 2:
Temperature: 940° C.
Time: 17 hours
Cp: 1.1%
CO: 20 vol. %
$NH_3$: 15 vol. %
The carbonitrided ring was then cooled to 100° C. in air.
The carbonitriding conditions are summarised in FIG. 2. The case depth was approximately 1.5 mm, calculated by micrograph analysis.

The carbonitrided samples were subjected to a series of rehardening tests, which included both martensitic quenching and bainite transformation. The conditions for these heat treatments are summarised as follows:
  1 #: 865° C. 75 min/210° C. 10 min/215° C. 660 min/240° C. 300 min
  2 #: 865° C. 75 min/180° C. 10 min/air cooling 30 min/7° C. pressure-quenched 30 min/235° C. 120 min
  3 #: 870° C. 75 min/215° C. 10 min/215° C. 300 min/240° C. 160 min
  4 #: 800° C. 80 min/65° C. in oil 10 min/10° C. water 10 min/190° C. 240 min Samples 1 # and 3 # involved bainite transformation, whereas samples 2 # and 4 # involved martensitic quenching and served as comparative examples.

The resulting inner rings were tested for hardness and their microstructures were also analyzed. Table 1 shows the surface and core hardness (in HRC) of each of the samples (i.e. at depths of 0.1, 0.5, 1.0, 1.5, 2.5 and 4.5 mm below (from) the surface).

TABLE 1

| Sample No. (22220 inner rings) | Hardness Curve (HRC) | | | | | |
|---|---|---|---|---|---|---|
| | 0.1 mm | 0.5 mm | 1.0 mm | 1.5 mm | 2.5 mm | 4.5 mm |
| 1# | 60.0 | 59.7 | 58.5 | 56.6 | 54.4 | 53.9 |
| 2# | 60.4 | 60.7 | 59.6 | 57.2 | 54.6 | 54.3 |
| 3# | 60.4 | 60.5 | 59.7 | 57.9 | 54.3 | 54.0 |
| 4# | 62.0 | 61.7 | 60.0 | 57.6 | 55.7 | 54.8 |

Figure 3:
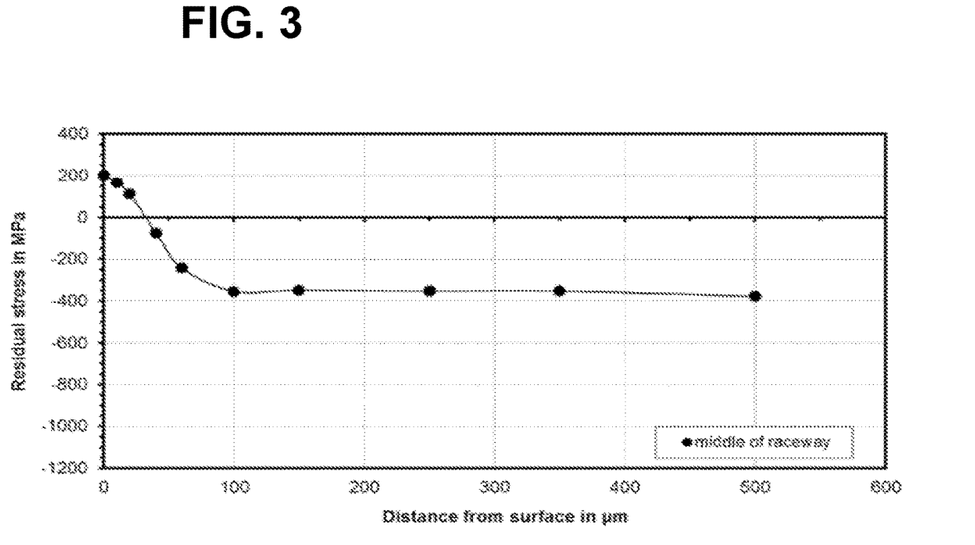
FIG. 3 shows a plot of residual stress against distance from the surface for sample 1 # of Example 1.
Figure 4:
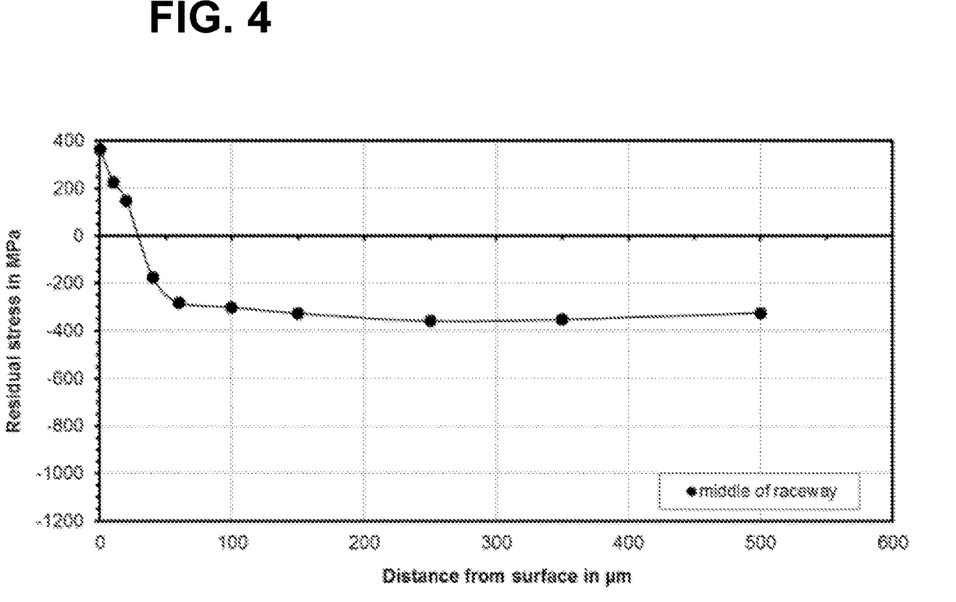
FIG. 4 shows a plot of residual stress against distance from the surface for sample 3 # of Example 1.
Figure 5:
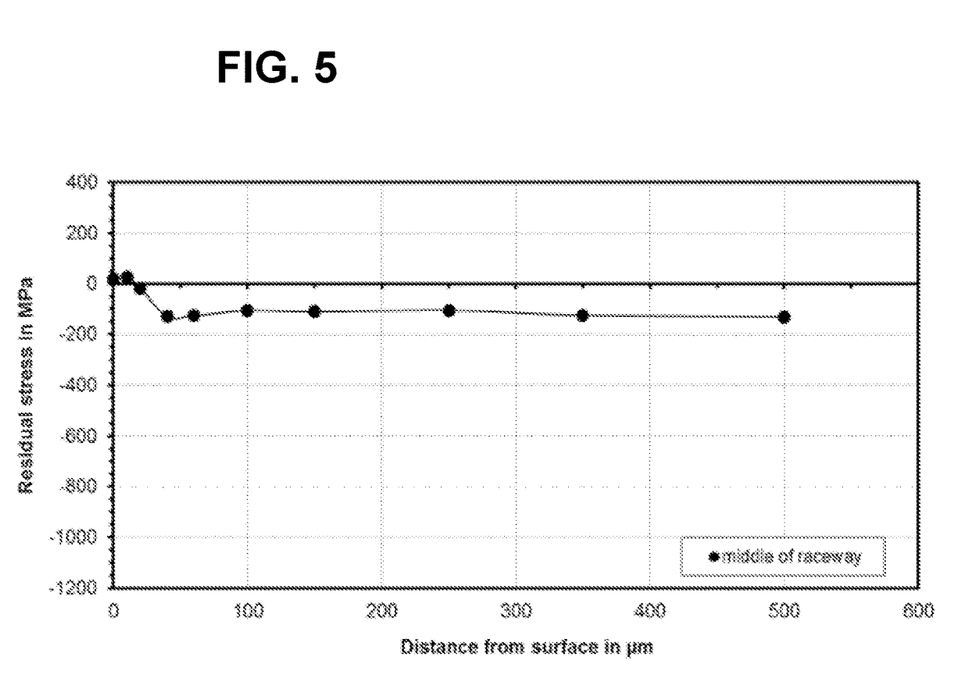
FIG. 5 shows a plot of residual stress against distance from the surface for sample 2 # of Example 1.

Although the hardness and microstructure of all the samples were acceptable, the residual stress testing showed that residual compressive stress after bainite quenching was nearly −400 MPa, but was only about −100 MPa after martensitic quenching (see FIG. 3 for sample 1 #, FIG. 4 for sample 3 # and FIG. 5 for sample 2 #).

The higher residual compressive stress is beneficial for increasing the fatigue life of the bearing. Comparing the heat treatment durations of the conditions for samples 1 # and 3 #, the time cost during bainite transformation is 460 min (215° C./300 min and 240° C./160 min) in 3 #, whereas the time cost is 960 min (215° C./660 min and 240° C./300 min) in 1 #. The heat treatment in 3 # is therefore preferable due to the time cost being shorter than for 1 #. An even shorter time cost is preferable.

Example 2

Two sets of 197726-type bearings were produced according to the present teachings and were used for train wagons. The inner ring and outer ring were formed from a steel composition comprising (all in weight percent) 0.42 C, 1.05 Cr, 0.75 Mn, 0.25 Mo, and 0.30 Si, the balance being iron and unavoidable impurities.

197726 type tapered roller bearings have the following dimensions:
Outer diameter: 230 mm
Inner diameter: 130 mm
Roller diameter: (large end) 24.74 mm
Width: 150 mm
Number of Rollers: 42 (two inner rings)

Additional aspects of the present teachings disclosed herein include, but are not limited to:

1. An inner or outer ring for a roller bearing, the inner or outer ring being formed from a steel composition comprising:
   from 0.30-0.45 wt. % carbon;
   from 0.1-0.7 wt. % silicon;
   from 0.6-0.9 wt. % manganese;
   from 0.9-1.2 wt. % chromium;
   from 0.15-0.7 wt. % molybdenum;
   from 0-2.0 wt. % nickel;
   from 0-0.02 wt. % phosphorus;
   from 0-0.02 wt. % sulfur; and
   the balance iron, together with unavoidable impurities;
   wherein the microstructure of the steel composition comprises bainite; and
   wherein a carbonitrided case layer is provided on a surface of the inner or outer ring.

2. The inner or outer ring of the above Aspect 1, wherein the carbonitrided case layer has a case layer depth of from 0.7 to 3.5 mm, preferably from 1.0 to 2.5 mm.

3. The inner or outer ring of the above Aspect 1 or the above Aspect 2, wherein the inner or outer ring has a core hardness of greater than 45 HRC.

4. The inner or outer ring of any one of the above Aspects 1 to 3, wherein the inner or outer ring has a residual compressive stress of at least −200 MPa at least at a perpendicular distance of 100 μm or more from the carbonitrided surface of the inner or outer ring, preferably from −200 MPa to −900 MPa, more preferably at least −300 MPa.

5. A method of heat treatment to obtain an inner or outer ring for a roller bearing, the method comprising:
   (i) providing a ring formed from a steel composition comprising:
      from 0.30-0.45 wt. % carbon;
      from 0.1-0.7 wt. % silicon;
      from 0.6-0.9 wt. % manganese;
      from 0.9-1.2 wt. % chromium;
      from 0.15-0.7 wt. % molybdenum;
      from 0-2.0 wt. % nickel;
      from 0-0.02 wt. % phosphorus;
      from 0-0.02 wt. % sulfur; and
      the balance iron, together with unavoidable impurities;
   (ii) treating the ring to a carbonitriding process to obtain a carbonitrided ring, wherein a carbonitrided case layer is provided on a surface of the carbonitrided ring;
   (iii) optionally, heating the carbonitrided ring to at least partially austenitise the steel composition (this step may be omitted if the final product does not require retained austenite);
   (iv) maintaining the carbonitrided ring at a temperature of from 210° C. to 250° C. for from 4 to 7 hours after step (iii) to obtain a heat-treated ring wherein the microstructure of the steel composition comprises bainite; and
   (v) recovering the heat-treated ring.

6. The method of the above Aspect 5, wherein the total duration of the carbonitriding process of step (ii) is from 5 to 35 hours.

7. The method of the above Aspect 5 or the above Aspect 6, wherein the conditions of the carbonitriding process of step (ii) include heating the ring to a temperature of 850° C. to 970° C. in an atmosphere having a carbon monoxide concentration of from 5 to 25 vol. % and an ammonia concentration of from 5 to 15 vol. %, preferably wherein the carbon potential of the atmosphere is from 0.6 to 1.2%.

8. The method of any one of the above Aspects 5 to 7, wherein step (iii) comprises heating the carbonitrided ring to a temperature of from 860° C. to 880° C. for from 60 to 90 minutes.

9. The inner or outer ring of any one of the above Aspects 1 to 4, wherein the inner or outer ring has been heat treated by a method according to any one of the above Aspects 5 to 8.

10. A roller bearing comprising an inner ring and/or outer ring as defined in any one of the above Aspects 1 to 4 or the above Aspect 9.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved roller bearing rings and heat treatment methods for roller bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. An inner ring or an outer ring for a roller bearing, wherein at least a core of the inner or outer ring is composed of a steel composition comprising:
   0.30-0.45 wt. % carbon;
   0.1-0.7 wt. % silicon;
   0.65-0.9 wt. % manganese;
   0.9-1.2 wt. % chromium;
   0.15-0.7 wt. % molybdenum;
   0-2.0 wt. % nickel;
   0-0.02 wt. % phosphorus; and
   0-0.02 wt. % sulfur;
   the balance being iron and unavoidable impurities;
   wherein:
   the core has a microstructure that comprises bainite; and
   a carbonitrided case layer is provided on a surface of the inner ring or the outer ring adjacent to the core.

2. The inner ring or outer ring according to claim 1, wherein the carbonitrided case layer has a case layer depth of 0.7 to 3.5 mm.

3. The inner ring or outer ring according to claim 1, wherein the carbonitrided case layer has a case layer depth of 1.0 to 2.5 mm.

4. The inner ring or outer ring according to claim 1, wherein the core has a hardness of at least 45 HRC.

5. The inner ring or outer ring according to claim 1, wherein the inner or outer ring has a residual compressive stress of at least −200 MPa at a distance of 100 μm or more perpendicular from the surface of the inner ring or the outer ring having the carbonitrided case layer.

6. The inner ring or outer ring according to claim 1, wherein the microstructure comprises at least 60 vol. % bainite.

7. The inner ring or outer ring according to claim 1, wherein the microstructure comprises at least 90 vol. % bainite.

8. The inner ring or outer ring according to claim 1, wherein the microstructure comprises less than 5 vol. % of retained austenite.

9. The inner or outer ring according to claim 1, wherein the core contains 0.2 vol. % or less of carbides, nitrides and carbonitrides.

10. A roller bearing comprising:
    an inner ring;
    an outer ring; and
    a plurality of rolling elements disposed between and contacting the inner ring and the outer ring;
    wherein the inner ring and/or the outer ring is the inner ring or outer ring of claim 1.

11. An inner ring or outer ring for a roller bearing, wherein at least a core of the inner or outer ring is composed of a steel composition comprising:
    0.39-0.45 wt. % carbon;
    0.2-0.4 wt. % silicon;
    0.7-0.8 wt. % manganese;
    1.0-1.1 wt. % chromium;
    0.15-0.3 wt. % molybdenum;
    0-0.7 wt. % nickel;
    0-0.02 wt. % phosphorus; and
    0-0.02 wt. % sulfur;
    the balance being iron and unavoidable impurities;
    wherein:
    the core has a microstructure that comprises bainite; and
    a carbonitrided case layer is provided on a surface of the inner ring or the outer ring adjacent to the core.

12. The inner ring or outer ring of claim 11, wherein:
    the microstructure comprises at least 90 vol. % bainite;
    the case layer depth of the carbonitrided case layer is 1.0 to 2.5 mm;
    the core has a hardness of at least 45 HRC; and
    the residual compressive stress at a distance of 100 μm or more perpendicular from the surface of the inner ring or the outer ring having the carbonitrided case layer is −300 MPa to −900 MPa.

13. A roller bearing comprising:
    an inner ring;
    an outer ring; and
    a plurality of rolling elements disposed between and contacting the inner ring and the outer ring;
    wherein the inner ring and/or the outer ring is the inner ring or outer ring of claim 11.

14. The roller bearing according to claim 13, wherein the roller bearing is a spherical roller bearing or a tapered roller bearing.

15. A method for heat treating an inner ring or an outer ring for a roller bearing, the method comprising:
    providing a ring formed from a steel composition comprising:
    0.30-0.45 wt. % carbon;
    0.1-0.7 wt. % silicon;
    0.6-0.9 wt. % manganese;
    0.9-1.2 wt. % chromium;
    0.15-0.7 wt. % molybdenum;
    0-2.0 wt. % nickel;
    0-0.02 wt. % phosphorus; and
    0-0.02 wt. % sulfur;
    the balance being iron and unavoidable impurities;

(ii) subjecting the ring to a carbonitriding process to obtain a carbonitrided ring having a carbonitrided case layer provided on a surface of the carbonitrided ring; and (iii) after step (ii), holding the carbonitrided ring at a temperature of 210° C. to 250° C. for 4-7 hours to obtain a heat-treated ring having a microstructure that comprises bainite.

16. The method according to claim 15, further comprising:

between steps (ii) and (iii), heating the carbonitrided ring to at least partially austenitize the steel composition.

17. The method according to claim 16, wherein, to at least partially austenitize the steel composition, the carbonitrided ring to a temperature of 860° C. to 880° C. for 60-90 minutes.

18. The method according to claim 15, wherein a total duration of the carbonitriding process of step (ii) is from 5 to 35 hours.

19. The method according to claim 18, wherein the carbonitriding process of step (ii) includes:

heating the ring to a temperature of 850° C. to 970° C. in an atmosphere having a carbon monoxide concentration of 5 to 25 vol. % and an ammonia concentration of 5 to 15 vol. %.

20. The method according to claim 19, wherein the atmosphere has a carbon potential of 0.6 to 1.2% during step (ii).

21. The method according to claim 15, wherein the steel composition comprises 0.65-0.9 wt. % manganese.

* * * * *